United States Patent [19]
Friedrich et al.

[11] Patent Number: 5,762,582
[45] Date of Patent: Jun. 9, 1998

[54] DRIVE UNIT WITH INTERNAL COMBUSTION ENGINE AND HYDRODYNAMIC RETARDER

[75] Inventors: Jurgen Friedrich, Crailsheim; Hans Gebhardt, Langenzenn; Heribert Moller, Sachsen; Klaus Vogelsang, Crailsheim, all of Germany

[73] Assignee: Voith Turbo GmbH, Germany

[21] Appl. No.: 580,058

[22] Filed: Dec. 20, 1995

[30] Foreign Application Priority Data

Dec. 23, 1994 [DE] Germany .......................... 44 46 288.3

[51] Int. Cl.⁶ .................................................. B60K 41/20
[52] U.S. Cl. ........................ 477/208; 188/290; 192/4 B; 477/184
[58] Field of Search ..................... 74/730.1; 475/33, 475/83, 113; 123/319, 320; 188/290, 293, 296; 192/4 B; 477/208, 182, 183, 184, 186, 187, 199

[56] References Cited

U.S. PATENT DOCUMENTS

| | | | |
|---|---|---|---|
| 3,640,359 | 2/1972 | Clark et al. | 192/4 B |
| 3,650,358 | 3/1972 | Bessiere | 477/208 |
| 3,720,372 | 3/1973 | Jacobs | 237/12.3 |
| 3,882,973 | 5/1975 | Hakes | 188/290 |
| 3,945,473 | 3/1976 | Prather | 188/296 |
| 4,538,553 | 9/1985 | Kurz et al. | 123/41.13 |
| 5,029,682 | 7/1991 | Maurer et al. | 192/4 B |

FOREIGN PATENT DOCUMENTS

| | | |
|---|---|---|
| 2 673 900 | 3/1992 | France . |
| 19 46 167 | 11/1975 | Germany . |
| 3301560 | 4/1984 | Germany . |
| 3301560 C1 | 4/1984 | Germany . |
| 3713580 | 11/1988 | Germany . |
| 3713580 C1 | 11/1988 | Germany . |
| 4408350 A1 | 10/1994 | Germany . |

OTHER PUBLICATIONS

European Search Report, EP 95 12 0003 dated Jun. 17, 1997.
Revue Technique Diesel (French Article), 1985.

Primary Examiner—Charles A. Marmor
Assistant Examiner—Sherry Lynn Estremsky
Attorney, Agent, or Firm—Baker & Daniels

[57] ABSTRACT

A drive unit, notably for a motor vehicle with an internal combustion engine and a transmission. The drive unit has two hydrodynamic retarders, each featuring a rotor and a stator. A primary retarder precedes the transmission in the power train and a secondary retarder follows the transmission in the power train.

6 Claims, 2 Drawing Sheets

DRIVE UNIT WITH INTERNAL COMBUSTION ENGINE AND HYDRODYNAMIC RETARDER

BACKGROUND OF THE INVENTION

The present invention relates to a drive unit, notably for a motor vehicle having an internal combustion engine, a transmission, and a hydrodynamic retarder featuring a rotor and a stator which precedes the transmission in the drive train.

Such a drive unit is known from DE 37 13 580 C1.

Retarders are used in heavy vehicles, particularly for absorbing the kinetic braking energy that accrues in braking actions during high speed travel (adaptation braking) and converting that energy to heat. Retarders are also well suited for sustained braking actions, for example, at a constant speed of 30 km/h on a 7% incline. Oil normally serves as the operating fluid. The heat transferred in the retarder to the operating fluid needs to be transferred, by means of a specific heat exchanger, from the operating fluid to the engine coolant or ambient air.

The retarder disclosed by U.S. Pat. No. 3,720,372 is integrated in the drive engine, permanently joined to the crankshaft and always flooded by the coolant of the cooling system. The rotor of the retarder serves as a circulation pump, instead of using a separate coolant pump. This system heats the coolant by means of the retarder and thereby heats the passenger compartment. A control system arranged on the retarder, which controls the distribution of the coolant depending on its temperature in a bypass line through the radiator can also be used to heat the passenger compartment.

Also known, from DE-PS 33 01 560, is a retarder which is connected by a shift clutch to the crankshaft of the drive engine and the driven wheels of the vehicle. The purpose of this retarder is not the absorption and conversion of high kinetic braking energy of the vehicle to heat, instead the retarder is operated exclusively as a heater, with the heating output controlled by the available power. The engine coolant also functions as the operating fluid of the retarder.

A retarder known from DE-AS 1 946 167 (U.S. Pat. No. 3,650,358) is powered by the crankshaft of an internal combustion engine whose coolant also serves as the operating fluid for the retarder. The advantage of this mode of operation is that the accruing heat develops directly in the coolant passed to the radiator, eliminating the need for a heat exchanger between two fluids. The rotor is mounted on an antifriction bearing and the seal between the frame and rotor shaft is established by two lip seals.

In the drive unit according to DE 37 13 580 C1, the hydrodynamic retarder precedes the transmission in the flow of traction, or drive train, and is called a primary retarder.

Primary retarders are operated with either oil or water. The pattern of the torque over the travel speed of the vehicle corresponds to a hyperbola, owing to the effect of the follow-on transmission. As a consequence, at low speeds of travel a relatively high braking effect is being produced.

One disadvantage of such primary retarders is that the braking force decreases at high speeds of travel. The braking torque generated by the retarder also decreases as the engine speed drops. This, too, may be very disadvantageous in certain traffic situations.

Also known are so-called secondary retarders which are arranged after the transmission in the drive train.

Plotted over the speed of travel, the braking moment generated by the retarder follows, in the first plotted section, a parabolic pattern. That is, the braking moment rises with increasing speed of travel and, consequently, is relatively high at high speeds of travel—which, of course, is favorable. Secondary retarders, however, have the disadvantage that at low speeds of travel they produce only a low braking moment.

SUMMARY OF THE INVENTION

The objective underlying the present invention is to fashion a drive unit in such a way that the braking moment produced by the retarder is acceptable at both low and high speeds of travel.

This objective is accomplished by using a drive unit having both a primary and secondary retarder. Accordingly, two hydrodynamic retarders are thus provided, one before and one after the transmission. This arrangement produces a braking moment which is acceptable at both low and high speeds of travel. At low speeds the primary retarder is effective and a sufficient braking moment is also available at high speeds of travel and low engine speeds due to the secondary retarder.

Both the primary retarder and the secondary retarder can be configured as so-called water pump retarders. This means that the engine coolant is also used as the operating medium of the retarder. Water is in this case the operating medium.

The available braking effect of the drive unit can be optimized by a distribution between the two retarder systems based upon the traffic situation or state of operation. Naturally, this distribution can be effected by a controller. By splitting the output between the primary retarder and secondary retarder, one can accurately avoid exceeding the transmittable power limit of the shift clutch, which is generally a friction clutch. Traction is not interrupted in the shifting pauses across a wide range of speed, particularly for a range of high output braking actions. The braking effect can be kept nearly constant over a relatively large range of speeds.

BRIEF DESCRIPTION OF THE DRAWINGS

The invention is explained in more detail with the aid of the drawings wherein.

DETAILED DESCRIPTION

Figure 1:
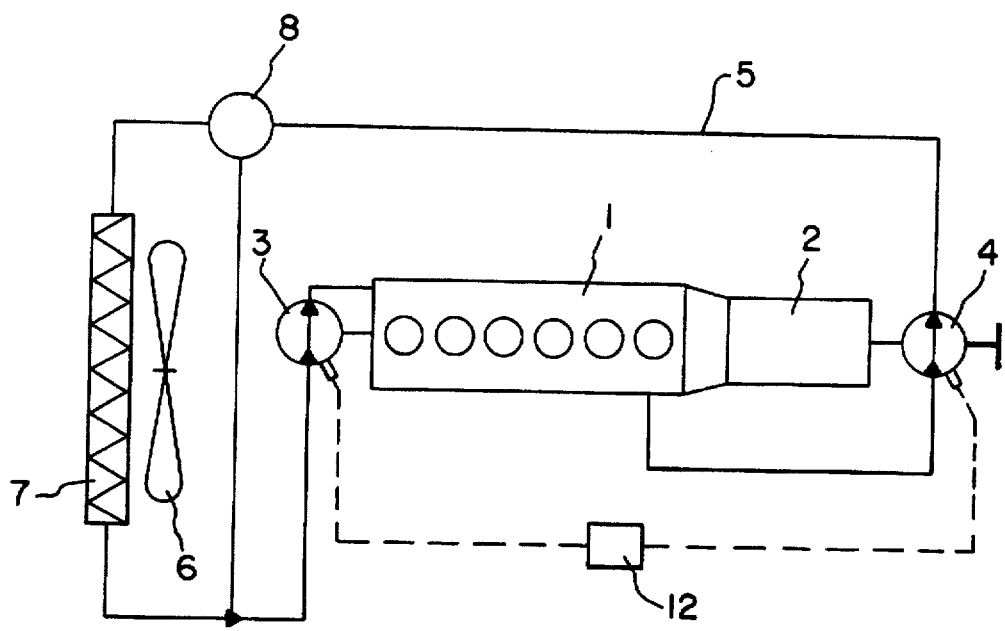
FIG. 1 is a schematic representation of a first embodiment of the present invention.

FIG. 1 is a schematic illustration of a drive unit for a motor vehicle with an internal combustion engine 1 and a transmission 2. A primary retarder 3 precedes the engine 1, and a secondary retarder 4 follows the transmission 2.

A cooling circuit comprised of cooling water lines 5, fan 6, radiator 7 and thermostat 8 is also provided.

The rotor of the primary retarder 3 is mounted on the crankshaft of engine 1 in floating fashion in a cantilevered manner and is, therefore, axially parallel with the engine 1 and transmission 2. The secondary retarder 4 is also arranged axially parallel to engine 1 and transmission 2. There is no gearing up provided between transmission 2 and secondary retarder 4. Controller 12 is operatively connected to primary retarder 3 and secondary retarder 4 and functions as a means for controlling the braking outputs of primary retarder 3 and secondary retarder 4.

Figure 2:
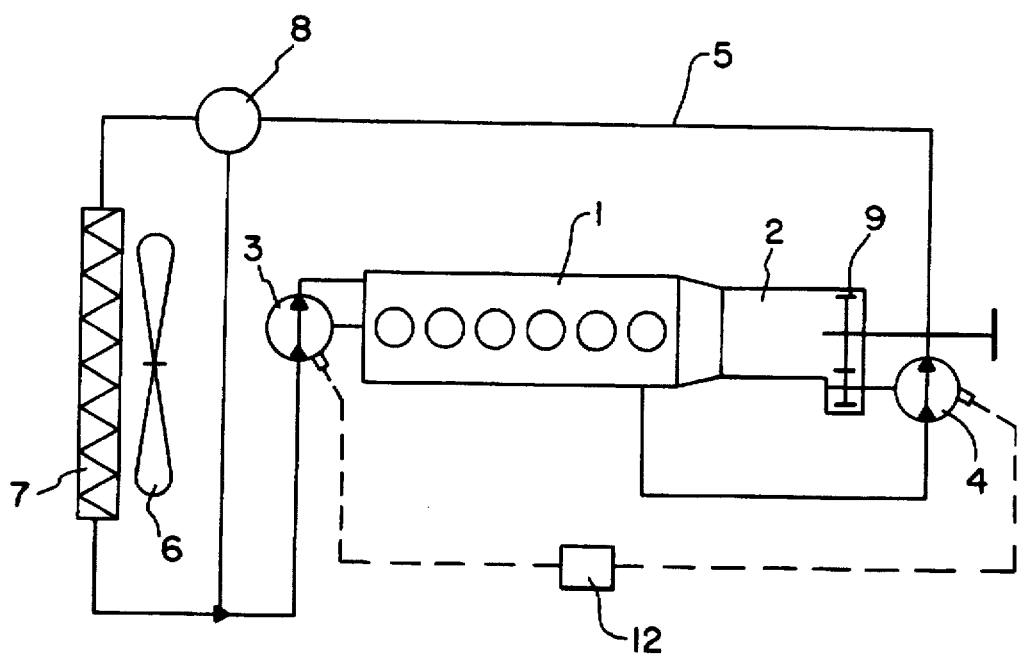
FIG. 2 is a schematic representation of a second embodiment of the present invention.

The embodiment of FIG. 2 also features a primary retarder 3 and a secondary retarder 4. In contrast to the embodiment of FIG. 1, the embodiment of FIG. 2 has a gear-up mechanism 9 arranged between transmission 2 and secondary retarder 4. Otherwise, all of the essential components of this drive unit match those of FIG. 1.

Figure 3:
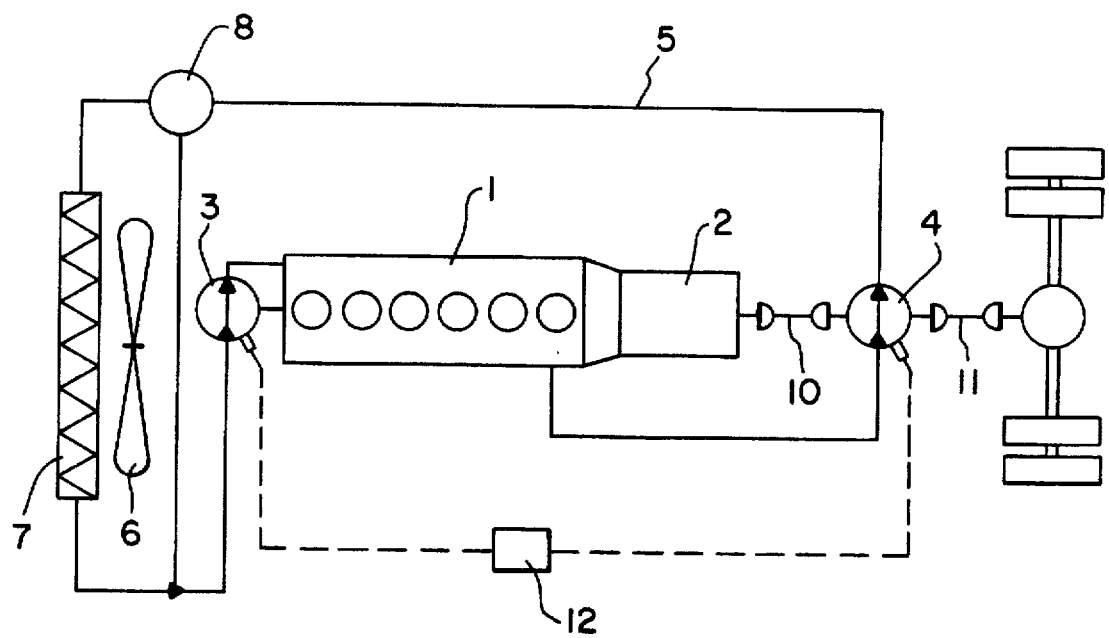
FIG. 3 is a schematic representation of a third embodiment of the present invention.

In the embodiment schematically illustrated by FIG. 3, a first jointed shaft train 10 is arranged between transmission 2 and secondary retarder 4, and a second jointed shaft train 11 is arranged in the drive train after the secondary retarder 4.

Figure 4:
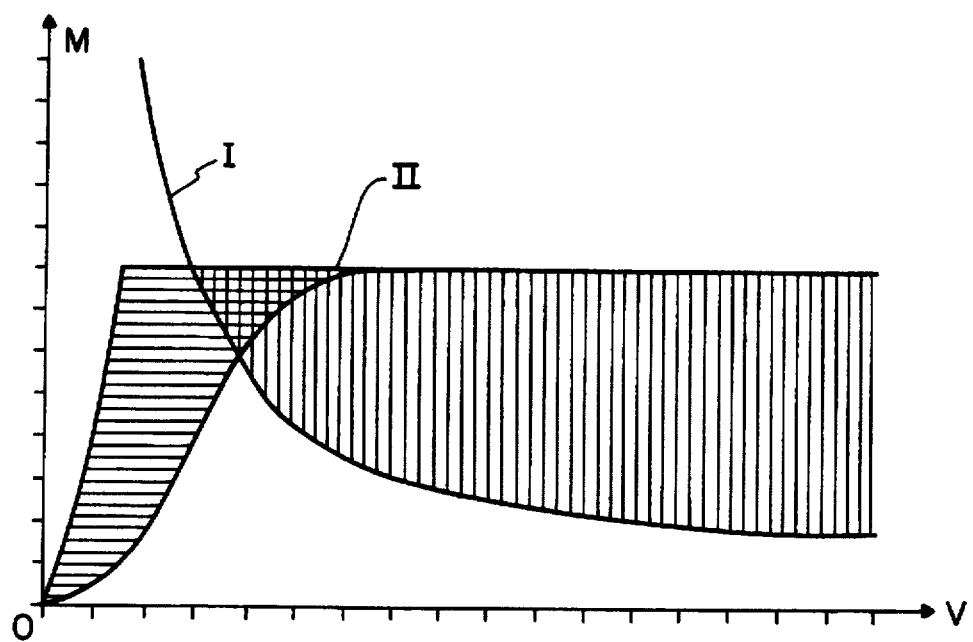
FIG. 4 is a graph plotting the braking moment M against the speed of travel V.

FIG. 4 shows a diagram illustrating the progression of braking moment M plotted against the speed of travel V.

The diagram is composed of two curves, namely curve I of the primary retarder and curve II of the secondary retarder.

The horizontal hatching represents a braking moment deficit that would be encountered if only a secondary retarder were used. This deficit is compensated for in an embodiment of the present invention, however, by the primary retarder. The vertical hatching represents a deficit that would occur if only a primary retarder were used. This deficit is compensated for in an embodiment of the present invention, though, by the secondary retarder.

What is claimed is:

1. A drive unit for a motor vehicle having a drive train with an internal combustion engine and a transmission connected thereto and wherein power flows in a power flow direction from said engine to said transmission, said drive unit comprising:

a primary hydrodynamic retarder having a stator and a cooperatively disposed rotor, said primary retarder operatively connected to the drive train ahead of the transmission with respect to the power flow direction;

a secondary hydrodynamic retarder having a stator and a cooperatively disposed rotor, said secondary retarder operatively connected to the drive train behind the transmission with respect to the power flow direction; and control means for controlling outputs of said primary retarder and said secondary retarder whereby a combined output of both said primary retarder and said secondary retarder can be maintained at a relatively constant value over a relatively large range of travel speeds.

2. The drive unit of claim 1 wherein the primary retarder is operatively connected to the drive train ahead of the engine with respect to the power flow direction.

3. The drive unit of claim 2 wherein the rotor of said primary retarder is mounted on a crankshaft of the engine.

4. The drive unit of claim 3 wherein said rotor of said primary retarder is cantileveredly mounted on said crankshaft.

5. The drive unit of claim 1 wherein at least one of said primary retarder and said secondary retarder circulates an engine coolant, said engine coolant being used to cool said engine.

6. A drive unit for a motor vehicle having a drive train with an internal combustion engine and a transmission connected thereto and wherein power flows in a power flow direction from said engine to said transmission, said drive unit comprising:

a primary hydrodynamic retarder having a stator and a cooperatively disposed rotor, said primary retarder operatively connected to the drive train ahead of the transmission with respect to the power flow direction.

a secondary hydrodynamic retarder having a stator and a cooperatively disposed rotor, said secondary retarder operatively connected to the drive train behind the transmission with respect to the power flow direction; and a gear-up mechanism operatively disposed between the drive train and at least one of said primary retarder and said secondary retarder whereby an angular velocity of said at least one retarder is increased.

* * * * *